US010856322B2

(12) United States Patent
Martin et al.

(10) Patent No.: US 10,856,322 B2
(45) Date of Patent: *Dec. 1, 2020

(54) TELECOMMUNICATIONS APPARATUS AND METHODS

(71) Applicant: Sony Corporation, Tokyo (JP)

(72) Inventors: Brian Alexander Martin, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,106

(22) Filed: Aug. 8, 2019

(65) Prior Publication Data

US 2019/0364589 A1    Nov. 28, 2019

Related U.S. Application Data

(63) Continuation of application No. 15/964,944, filed on Apr. 27, 2018, now Pat. No. 10,433,331, which is a (Continued)

(30) Foreign Application Priority Data

Jan. 30, 2015    (EP) ...................................... 15153349

(51) Int. Cl.
*H04W 72/12*    (2009.01)
*H04W 4/70*    (2018.01)
(Continued)

(52) U.S. Cl.
CPC ......... *H04W 72/1289* (2013.01); *H04L 67/04* (2013.01); *H04L 67/32* (2013.01);
(Continued)

(58) Field of Classification Search
CPC ... H04W 72/1289; H04W 8/22; H04W 16/26; H04W 72/0446
See application file for complete search history.

(56) References Cited

U.S. PATENT DOCUMENTS 8,792,338 B2 *  7/2014  Lee ........................ H04W 76/50
                                                            370/229
9,432,927 B2 *  8/2016  Kim .................. H04W 52/0216
                     (Continued)

FOREIGN PATENT DOCUMENTS

EP    2757832 A1    7/2014
GB    2487757 A     8/2012
              (Continued)

OTHER PUBLICATIONS

International Search Report and Written Opinion dated Mar. 16, 2016 in PCT/EP2016/050433.
(Continued)

*Primary Examiner* — Khaled M Kassim
(74) *Attorney, Agent, or Firm* — Xsensus LLP

(57) ABSTRACT

A terminal device in a wireless telecommunication system which transmits a master information block and a first and a second system information block the first and second system information block comprising first and second scheduling information relating to the timing of at least one additional block of system information. The terminal device configured to receive the master information block of system information that comprises a marker instructing the terminal device to ignore the first scheduling information and process only the second scheduling information.

19 Claims, 8 Drawing Sheets

Related U.S. Application Data continuation of application No. 15/615,543, filed on Jun. 6, 2017, now Pat. No. 9,980,282, which is a continuation of application No. PCT/EP2016/050433, filed on Jan. 12, 2016.

(51) Int. Cl.
| | |
|---|---|
| *H04W 8/22* | (2009.01) |
| *H04L 29/08* | (2006.01) |
| *H04W 48/12* | (2009.01) |
| *H04W 16/26* | (2009.01) |
| *H04W 72/04* | (2009.01) |

(52) U.S. Cl.
CPC .............. *H04W 4/70* (2018.02); *H04W 8/22* (2013.01); *H04W 16/26* (2013.01); *H04W 48/12* (2013.01); *H04W 72/0446* (2013.01)

(56) References Cited

U.S. PATENT DOCUMENTS

| | | | |
|---|---|---|---|
| 9,510,173 B2* | 11/2016 | Cai | H04W 4/90 |
| 2005/0047579 A1* | 3/2005 | Salame | H04L 65/80 |
| | | | 379/265.09 |
| 2008/0212522 A1* | 9/2008 | Ko | H04W 48/12 |
| | | | 370/328 |
| 2012/0094699 A1* | 4/2012 | Tamura | H04W 48/12 |
| | | | 455/458 |
| 2012/0163305 A1* | 6/2012 | Nimbalker | H04W 52/0206 |
| | | | 370/329 |
| 2012/0250501 A1* | 10/2012 | Lee | H04W 4/90 |
| | | | 370/229 |
| 2012/0282965 A1 | 11/2012 | Kim et al. | |
| 2013/0094424 A1* | 4/2013 | Dhanda | H04W 4/06 |
| | | | 370/312 |
| 2013/0272294 A1* | 10/2013 | Mildh | H04W 56/001 |
| | | | 370/350 |
| 2013/0303240 A1* | 11/2013 | Sanka | H04W 72/1278 |
| | | | 455/558 |
| 2014/0003354 A1* | 1/2014 | Ekici | H04W 76/19 |
| | | | 370/329 |
| 2014/0133433 A1* | 5/2014 | Ahn | H04W 72/04 |
| | | | 370/329 |
| 2015/0057046 A1* | 2/2015 | Challa | H04W 68/12 |
| | | | 455/558 |
| 2015/0181575 A1* | 6/2015 | Ng | H04W 72/042 |
| | | | 370/329 |
| 2016/0135058 A1* | 5/2016 | Chen | H04L 5/0053 |
| | | | 370/329 |
| 2016/0135177 A1* | 5/2016 | Ahn | H04W 72/0446 |
| | | | 370/329 |
| 2016/0234759 A1* | 8/2016 | Kubota | H04W 48/12 |
| 2016/0249327 A1* | 8/2016 | Chen | H04L 5/0039 |
| 2017/0019912 A1* | 1/2017 | Ponukumati | H04W 72/1215 |
| 2017/0086131 A1* | 3/2017 | Gupta | H04W 36/0061 |
| 2017/0180164 A1* | 6/2017 | Hayes | H04L 1/0054 |

FOREIGN PATENT DOCUMENTS

| | | |
|---|---|---|
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| GB | 2497742 A | 6/2013 |
| GB | 2497743 A | 6/2013 |
| WO | 2011/100707 A1 | 8/2011 |
| WO | 2013/093436 A1 | 6/2013 |
| WO | 2013/093467 A1 | 6/2013 |
| WO | 2013/183966 A1 | 12/2013 |

OTHER PUBLICATIONS

"LTE; Evolved Universal Terrestrial Radio Access (E-UTRA); Radio Resource Control (RRC); Protocol specification (3GPP TS 36.331 version 10.1.0 Release 10)", ETSI TS 136 331 V10.1.0 (Apr. 2011), pp. 1-291 and Cover Page.

"Digital cellular telecommunications system (Phase 2+); Universal Mobile Telecommunications System (UMTS); LTE; Service requirements for Machine-Type Communications (MTC); Stage 1 (3GPP Ts 22.368 version 11.6.0 Release 11)", ETSI TS 122 368 V11.6.0 (Sep. 2012), pp. 1-20 and Cover Page.

Harri Holma and Antti Toskala, "LTE for UMTS OFDMA and SC-FDMA Based Radio Access", John Wiley and Sons, 2009 p. 25-27 and Cover Page.

\* cited by examiner

US 10,856,322 B2

TELECOMMUNICATIONS APPARATUS AND METHODS

CROSS-REFERENCE TO RELATED APPLICATIONS

This application is a continuation of U.S. application Ser. No. 15/964,944, filed Apr. 27, 2018, which is a continuation of U.S. application Ser. No. 15/615,543, filed Jun. 6, 2017 (now U.S. Pat. No. 9,980,282), which is a continuation of International Application No. PCT/EP2016/050433, filed Jan. 12, 2016, which claims priority to European Patent Application No. 15153349.4, filed Jan. 30, 2015, the entire contents of each of which are herein incorporated by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present disclosure relates to wireless telecommunications systems and methods.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on. Smart metering is merely one example of potential MTC device applications. Further information on characteristics of MTC-type devices can be found, for example, in the corresponding standards, such as ETSI TS 122 368 V11.6.0 (2012-09)/ 3GPP TS 22.368 version 11.6.0 Release 11) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

With this in mind there has been proposed a concept of so-called "virtual carriers" operating within the bandwidth of a "host carrier", for example, as described in GB 2 487 906 [2], GB 2 487 908 [3], GB 2 487 780 [4], GB 2 488 513 [5], GB 2 487 757 [6], GB 2 487 909 [7], GB 2 487 907 [8] and GB 2 487 782 [9]. One principle underlying the concept of a virtual carrier is that a frequency subregion (subset of frequency resources) within a wider bandwidth (greater range of frequency resources) host carrier is configured for use as a self-contained carrier for at least some types of communications with certain types of terminal device.

In some implementations, such as described in references [2] to [9], all downlink control signalling and user-plane data for terminal devices using the virtual carrier are conveyed within the subset of frequency resources associated with the virtual carrier. A terminal device operating on the virtual carrier is made aware of the restricted frequency resources and need only receive and decode a corresponding subset of transmission resources to receive data from the base station. An advantage of this approach is to provide a carrier for use by low-capability terminal devices capable of operating over only relatively narrow bandwidths. This allows devices to communicate on LTE-type networks, without requiring the devices to support full bandwidth operation. By reducing the bandwidth of the signal that needs to be decoded, the front end processing requirements (e.g., FFT, channel estimation, subframe buffering etc.) of a device configured to operate on a virtual carrier are reduced since the complexity of these functions is generally related to the bandwidth of the signal received.

Other virtual carrier approaches for reducing the required complexity of devices configured to communicate over LTE-type networks are proposed in GB 2 497 743 [10] and GB 2 497 742 [11]. These documents propose schemes for communicating data between a base station and a reduced-capability terminal device whereby physical-layer control information for the reduced-capability terminal device is transmitted from the base station using subcarriers selected from across a full host carrier frequency band (as for conventional LTE terminal devices). However, higher-layer data for reduced-capability terminal devices (e.g. user-plane data) is transmitted using only subcarriers selected from within a restricted subset of carriers which is smaller than and within the set of subcarriers comprising the system frequency band. Thus, this is an approach in which user-plane data for a particular terminal device may be restricted to a subset of frequency resources (i.e. a virtual carrier supported within the transmission resources of a host carrier), whereas control signalling is communicated using the full bandwidth of the host carrier. The terminal device is made aware of the restricted frequency resource, and as such need only buffer and process data within this frequency resource during periods when higher-layer data is being transmitted. The terminal device buffers and processes the full system frequency band during periods when physical-layer control information is being transmitted. Thus, the reduced-capability terminal device may be incorporated in a network in which physical-layer control information is transmitted over a wide frequency range, but only needs to have sufficient memory and processing capacity to process a smaller range of frequency resources for the higher-layer data. This approach may sometimes be referred to as a "T-shaped" allocation because the area of the downlink time-frequency resource grid to be used by the reduced-capability terminal device may in some cases comprise a generally T-shape.

Virtual carrier concepts thus allow terminal devices having reduced capabilities, for example in terms of their transceiver bandwidth and/or processing power, to be supported within LTE-type networks. As noted above, this can be useful for to allow relatively inexpensive and low complexity devices to communicate using LTE-type networks. However, providing support for reduced capability devices in a wireless telecommunications system which is generally based around existing standards can require additional considerations for some operational aspects of wireless telecommunications systems to allow the reduced-capability terminal devices to operate in conjunction with conventional terminal devices.

One area where the inventors have recognised a need for new procedures concerns the acquisition of system information. In broad summary, system information, or at least some aspects of system information, in existing wireless telecommunications systems, such as LTE-based telecommunications systems, is transmitted for all terminal devices in a broadcast manner. A reduced capability device, such as a device having a narrowband RF bandwidth of 1.4 MHz) that is required to obtain new system information must receive and decode these broadcasts, particularly if they are broadcast using a transport block size which is larger than what the UE supports, or if the resources used for transmission span more than the RF bandwidth of the device. In some instances the reduced capability devices may not be able to receive some of the larger System Information Blocks (SIBs) used to convey this system information. Similarly, in the context of coverage enhancement, it is sometimes difficult for a terminal device (whether reduced capability or not) to receive large SIBs. There is therefore a need for schemes which allow system information to be communicated to terminal devices operating on restricted frequency resources in wireless telecommunications systems. There is also a need for schemes which allow system information to be communicated to terminal devices operating in a coverage enhancement situation.

SUMMARY

According to one embodiment, there is provided a method of operating a terminal device in a wireless telecommunication system comprising receiving, at the terminal device, at least one of a plurality of blocks of system information at predetermined times, the blocks of system information including i) first scheduling information relating to the timing of at least one additional block of system information and ii) a marker indicating the presence of second scheduling information, wherein the second scheduling information provides an instruction to the terminal device relating to reception of at least one further block of system information.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
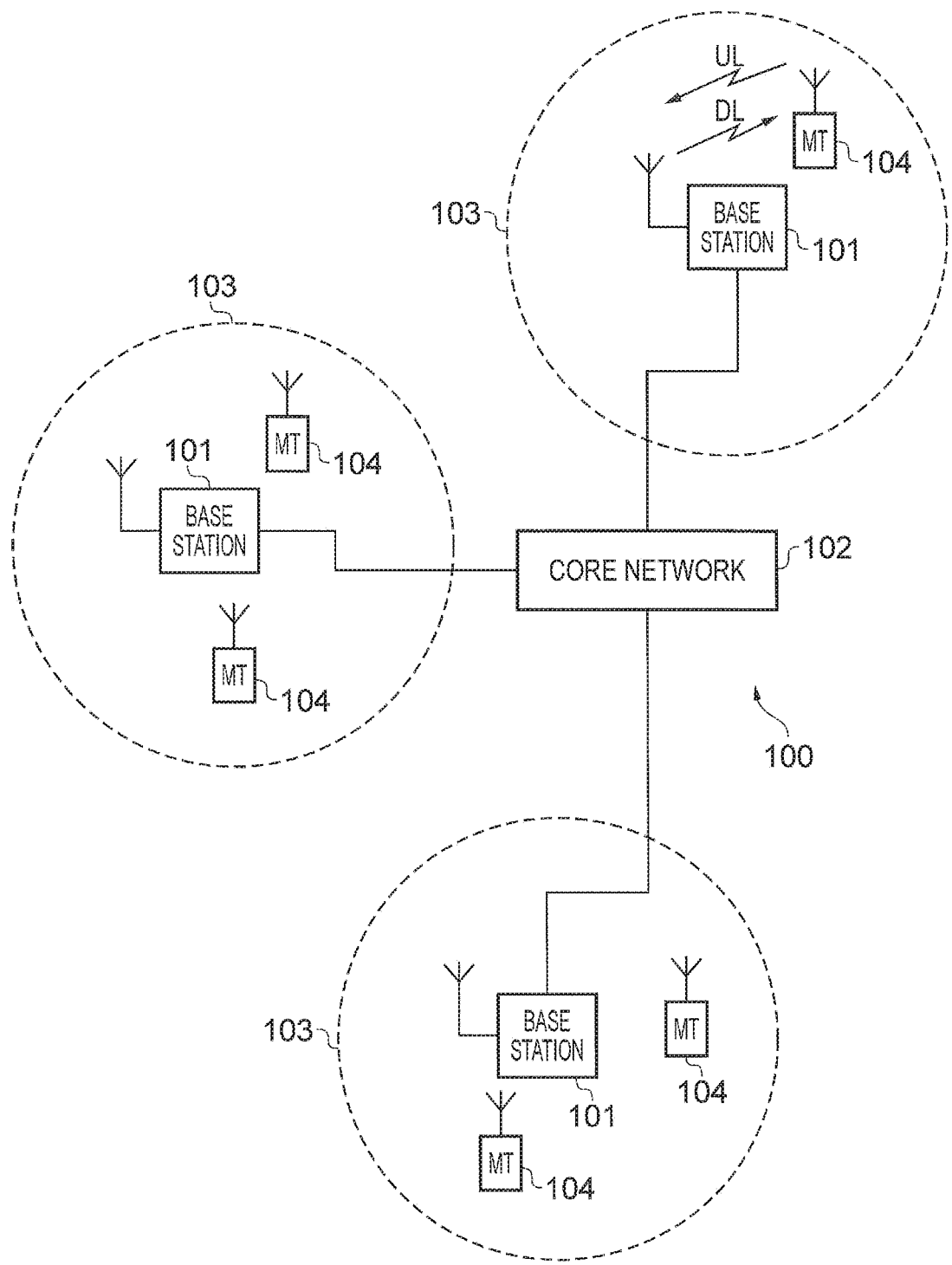
FIG. 1 schematically represents an example of a LTE-type wireless telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP® body and also described in many books on the subject, for example, Holma, H. and Toskala, A. [12].

The network 100 includes a plurality of base stations 101 connected to a core network 102. Each base station provides a coverage area 103 (i.e. a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-NodeBs, and so forth.

Figure 2:
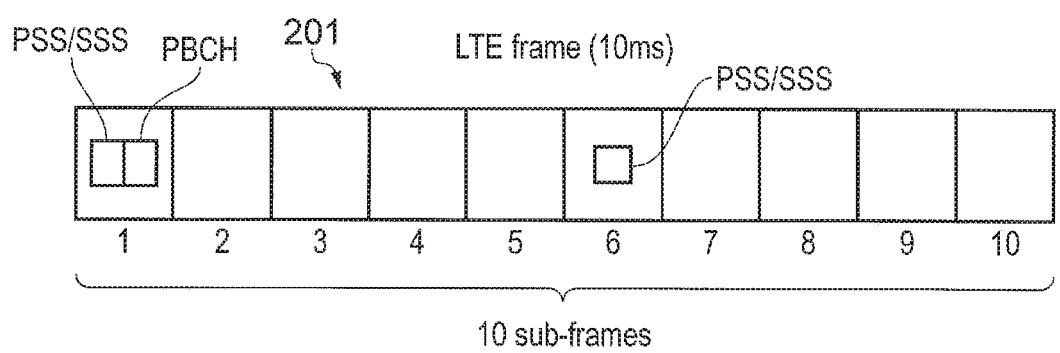
FIG. 2 schematically represents some aspects of a LTE downlink radio frame structure.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA). FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
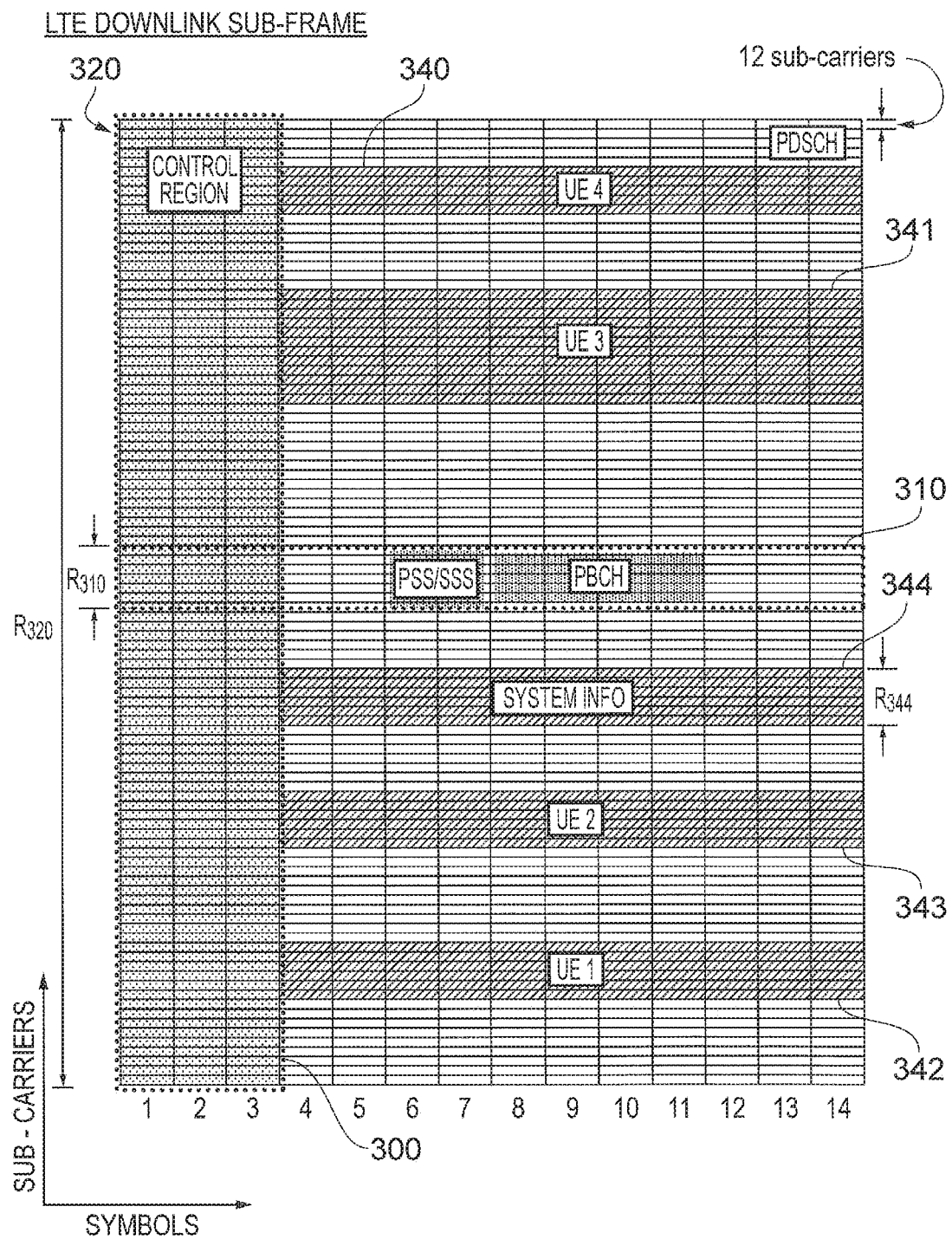
FIG. 3 schematically represents some aspects of a LTE downlink radio subframe structure.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers (i.e. 60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344.

A conventional LTE frame will also include reference signals which are not shown in FIG. 3 in the interests of clarity.

Figure 4:
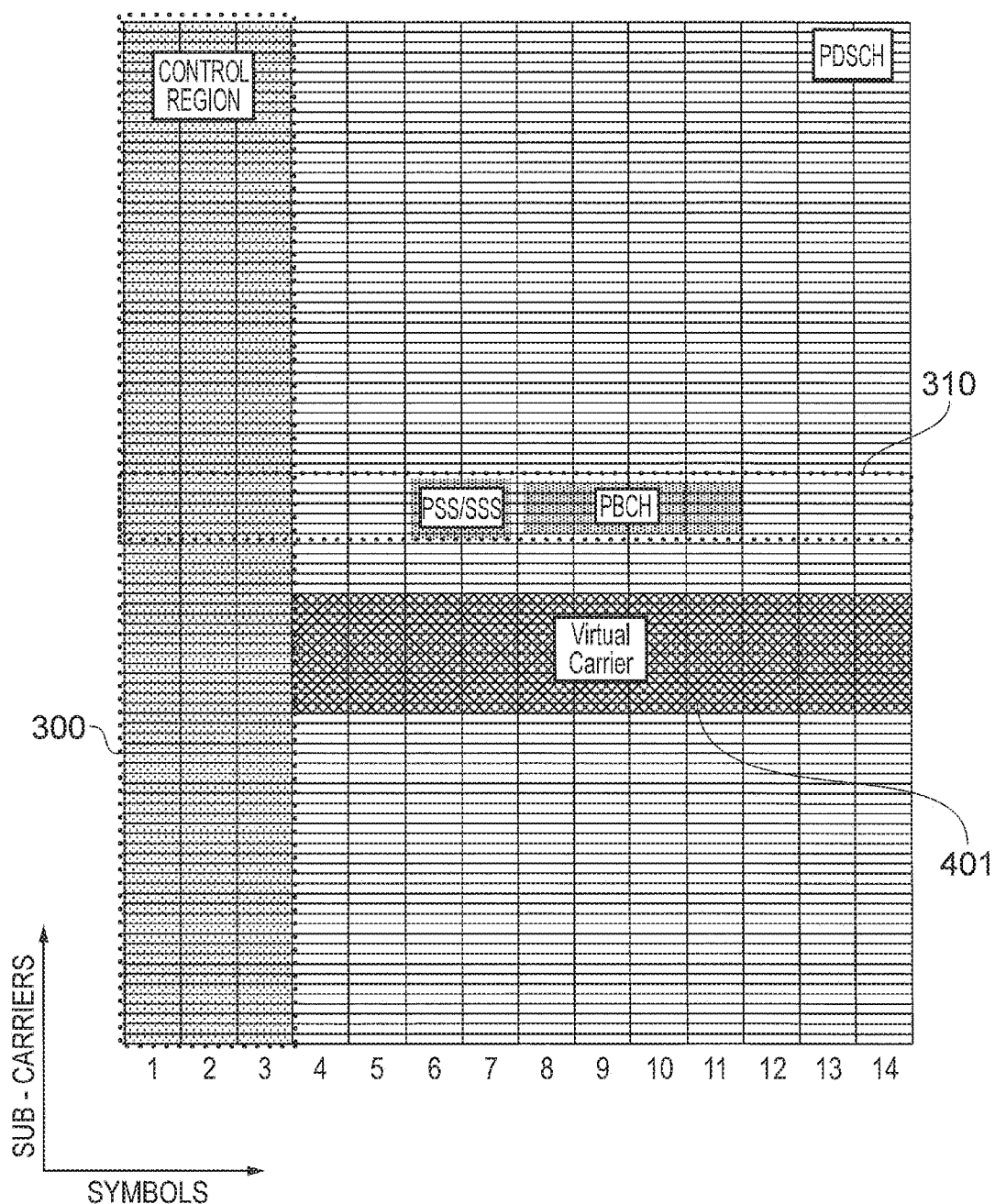
FIG. 4 schematically represents some aspects of a LTE downlink radio subframe structure associated with a host carrier supporting a virtual carrier.

FIG. 4 is a diagram which is similar to and will in many respect be understood from FIG. 3. However, FIG. 4 differs from FIG. 3 in schematically representing a downlink radio subframe corresponding to a host carrier in which a virtual carrier 401 (VC) is supported. The general operation of the virtual carrier represented in FIG. 4 may be in accordance with previously-proposed schemes, for example as described in any of the above-identified documents [2] to [11]. The virtual carrier thus represents a restricted subset of downlink transmission resources within the overall transmission resource grid associated with the host carrier which may be used for communicating at least some information with certain types of terminal devices, for example, reduced capability machine type communication terminal devices.

Thus, a conventional (i.e. non-reduced capability) terminal device may be supported using the full bandwidth of the resource grid represented in FIG. 4 in accordance with conventional LTE techniques. Downlink communications for a reduced-capability terminal device, on the other hand, may be restricted to a subset of transmission resources within the virtual carrier.

In some cases the entirety of the downlink communications for the reduced-capability terminal device (i.e. including control signalling and higher layer/user-plane data) may be conveyed within the transmission resources of one of the virtual carriers, for example in accordance with the principles proposed in the above-identified documents [2] to [9]. This may be appropriate, for example, for a terminal device which cannot receive the full bandwidth of the host carrier (and hence cannot receive the entirety of the control region 300).

In other cases the reduced-capability terminal device may be able to receive the full-bandwidth of the host carrier (and hence receive and decode the control region 300), but may be restricted as to its ability to buffer and decodes the entirety of the PDSCH region, and so may buffer and decode only a subset of the downlink transmission resources spanning the virtual carrier to which the terminal device has been allocated, for example in accordance with the "T-shaped allocation" principles proposed in the above-identified documents [10] and [11]. While this mode of operation may be referred to as a "T-shaped allocation" mode of operation for ease of reference, the PDSCH resources allocated to the reduced-capability terminal device need not be contiguous in frequency. That is to say that while the virtual carrier resources schematically represented in FIG. 4 are shown as a continuous block, in some examples the restricted subset of resources may be a subset of OFDM carriers distributed (spread) across the system bandwidth. Furthermore, it will be appreciated the subset of OFDM subcarriers comprising a virtual carrier for one particular terminal device may be different from a subset of OFDM subcarriers associated with supporting virtual carrier operation for another terminal device.

As noted above, virtual carrier operation can have an impact on how system information changes can be received by a reduced-capability terminal device.

In an LTE-based wireless telecommunications system some of the fundamental information required for a terminal device to operate in a cell is transmitted on PBCH in the Master Information Block (MIB). Other information regarding the system configuration is divided among System Information Blocks (SIBs) referred to as SIB1, SIB2, SIB3, . . . etc. (there are 16 SIBs defined as of Release 11 LTE). The SIBs are transmitted in system information (SI) messages, which, apart from SIB1, may contain multiple SIBs. There may be one or several SI messages transmitted at different periodicities. Each SI message may convey multiple SIBs suitable for scheduling with the same periodicity. The timings for SIB1 transmissions are fixed on an 80 ms period and they occur in the fifth subframe of radio frames when System Frame Number (SFN) is a multiple of 8 (i.e. SFN mod 8=0). There are retransmissions of SIB1 provided in every other radio frame within the 80 ms period. The timings for other SIB transmissions are configured in SIB1. The transmission resource allocations for the SI messages on PDSCH within a subframe are provided to terminal devices using PDCCH allocation messages addressed to SI-RNTI (System Information Radio Network Temporary Identifier—currently 0xFFFF in LTE). At higher layers, SI is carried on the logical broadcast control channel (BCCH).

The system information in a cell may be changed, although typically this happens rarely with system information perhaps remaining unchanged for hours, days, or even weeks.

For changes of system information other than those related to EAB (Extended Access Barring), ETWS (Earthquake Tsunami Warning System) and CMAS (Commercial Mobile Alert System), there is a BCCH modification period defined (which may be referred to as a "SI modification period"). SI modification period boundaries are defined on radio frames for which SFN mod q=0, for a cell-specific value of q. When there is a change in system information, the new system information is transmitted from the start of a new SI modification period.

The general process for implementing scheduling in system information in an LTE-based network is described, for example, in Section 5.2.1.2 of ETSI TS 136 331 V11.4.0 (2013-07)/3GPP TS 36.331 version 11.4.0 Release 11 [13]. In summary, a base station indicates a change of system information as follows.

More details on system information and scheduling in system information in an LTE-based system can be found in ETSI TS 136 331 V11.4.0 (2013-07)/3GPP TS 36.331 version 11.4.0 Release 11 [13].

As discussed above, it has been proposed to reduce the complexity of an LTE modem by reducing the baseband bandwidth over which certain types of terminal device operate. In particular, it may be desirable to reduce at least the baseband bandwidth over which the terminal device is to receive PDSCH (i.e. using T-shaped allocation virtual carrier techniques). This can have the advantages of lowering the complexity of subframe buffering, post-FFT buffering, channel estimation, and turbo decoding; and lower complexity creates an opportunity for lower modem cost and also reduced operational power consumption. Low complexity modems are particularly attractive for use in machine-type communication (MTC) terminal devices.

Such a reduced-capability terminal device might, for example, be adapted to receive PDCCH across a full system bandwidth spanning n physical resource blocks (PRBs), e.g. n=50 PRBs for a system bandwidth of 10 MHz at baseband. However, the terminal device might be adapted to receive PDSCH in a maximum of m PRBs, where m is less than n. For example m=6, corresponding to an effective bandwidth of 1.4 MHz at baseband for PDSCH.

The buffering requirements can be reduced if the UE is given an indication of which m PDSCH PRBs it must buffer before it needs to decode them, so that a buffer suitable for 6 instead of 50 PRBs can be provided. Since the RF bandwidth is not changed, these 6 PDSCH PRBs could be anywhere within the system bandwidth and, in general, might be contiguous or non-contiguous in frequency per subframe. In the subframe in which PDSCH decoding occurs, PDCCH can schedule any subset or the whole of the 6 PRBs since all 6 have been buffered by the UE. Some example techniques for establishing the predetermined subset of PDSCH resources to buffer at the terminal device can be found in GB 2 497 743 [10] and GB 2 497 742 [11], but in general any suitable technique can be used.

The restricted subset of transmission resources on which a reduced-capability terminal device can receive PDSCH in a given subframe impacts how system information messages should be handled in the wireless telecommunications system. A PDCCH resource allocation to SI-RNTI to indicate a change in system information is transmitted in the PDCCH common search space, and therefore all terminal devices receive the relevant SIBs using the same PDSCH resources (at least for system information which is relevant for all terminal devices). To be receivable by a reduced-capability terminal device, the SIBs should be scheduled on physical resource blocks which the reduced-capability terminal device will buffer in the relevant subframe. Furthermore, this will be a restricted number of PRBs, e.g. requiring SIBs to be transmitted within m (e.g. m=6) PRBs.

However, the base station also needs send user data to reduced capability (low complexity) terminal devices using the restricted subset of PDSCH resources for the terminal device. To help increase the number of reduced-capability terminal devices that can be supported in a network and overall scheduling flexibility, it can be helpful if different reduced-capability terminal devices can operate using different restricted subsets of transmission resources. This means the PDSCH resource blocks which different terminal devices are buffering to receive their own user data will not in general be the same resource blocks in which system information (SIBs) is sent. The previously proposed schemes for virtual carrier operation have addressed how a terminal device can acquire system information when attaching to a network, notwithstanding the terminal device's ability to decode only a restricted subset of PDSCH resources in a given subframe. However, different techniques may be needed when a reduced-capability terminal device is to acquire new system information, for example because of a change in system information, while it is connected to the network (e.g. in RRC connected mode).

Figure 5:
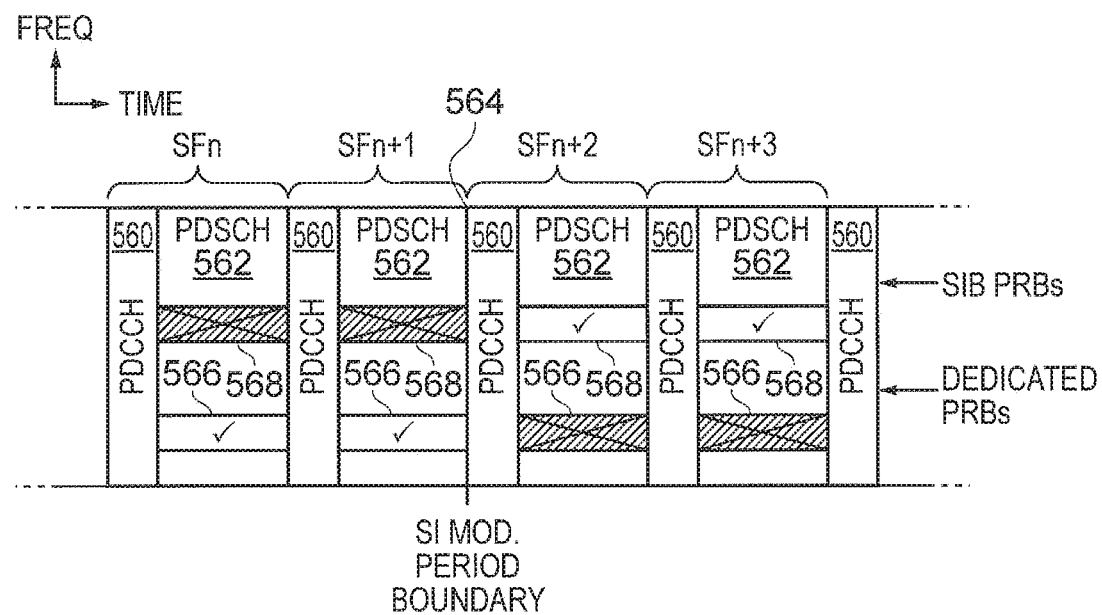
FIG. 5 schematically represents some aspects of a series of radio subframes spanning a system information modification period boundary for a host carrier supporting a virtual carrier.

FIG. 5 schematically represents a downlink frequency resource grid spanning four subframes labelled as SFn, SFn+1, SFn+2 and SFn+3 for an LTE-based wireless telecommunications system supporting a virtual carrier mode of operation in which a reduced-capability terminal device is restricted to buffering a subset of PDSCH resources while being able to receive the full bandwidth of PDCCH resources. As described above, each subframe comprises a PDCCH region 560 and a PDSCH region 562. Subframes SFn+1 and SFn+2 are assumed to span a system information modification period boundary 564, as schematically represented in the figure. Schematically represented in the PDSCH region of each subframe is an indication of the subset of transmission resources 566 which an example reduced-capability terminal device would use if it were receiving a user-plane data. These may be referred to as dedicated physical resource blocks for the reduced-capability terminal device. Also schematically represented in the PDSCH region of each subframe is an indication of the transmission resources 568 the base station would use if it were transmitting system information blocks in the relevant subframe. These may be referred to as SIB physical resource blocks. It will be appreciated the respective sets of transmission resources 566, 568 are shown as contiguous blocks occurring at the same place in each subframe purely for ease of representation. In practice the resources 566 comprising the dedicated PRBs for the reduced-capability terminal device may not be contiguous and their position and frequency may change in different subframes. Likewise for the resources 566 comprising the SIB PRBs (i.e. they may in general be scheduled on different frequency resources in each subframe).

In subframes SFn and SFn+1 the reduced-capability terminal device is assumed to be operating in a known "T-shaped" virtual carrier mode of operation in which it buffers the full PDCCH region 560 and the restricted subset of PDSCH transmission resources 566 established for dedicated user-plane data transmissions for the reduced-capability terminal device. While the device is buffering the dedicated PRBs 566 it is unable to buffer the transmission resources 568 used by the network for transmitting system information. This is schematically represented in FIG. 5 by a tick mark in the PDSCH transmission resources 566 comprising the dedicated PRBs and a cross mark and shading in the PDSCH resources 568 comprising the SIB PRBs.

In the schematic example represented in FIG. 5 it is assumed the base station is to make a change to system information at the system information modification period boundary 564 between subframes SFn+1 and SFn+2. The reason for the system information change in any given implementation is not significant to the operation of embodiments of the disclosure.

A reduced-capability terminal device can receive a system information change notification from a base station in the same way as for a conventional terminal device in the conventional manner discussed above. Established techniques can also be used to inform the terminal device of the transmission resources used for transmitting system information (i.e. the resources 568 identified in FIG. 5 as SIB PRBs).

However, an issue arises in that the reduced-capability terminal device may not be able to receive some of the larger SIBs. Further, in order to extend the coverage of these reduced capability devices, repetition of data in the SIB may be performed.

The inventors have identified various mechanisms to receive some of the larger SIBs in reduced capability terminal devices. One approach is to send a version of the SIB for non reduced-capability terminal devices and a copy of the SIB specifically for terminal devices operating at 1.4 MHz bandwidth and/or with coverage enhancement. This may involve removing non-essential information and cutting larger blocks down. However, even with this approach, the inventors have identified several issues.

Figure 6:
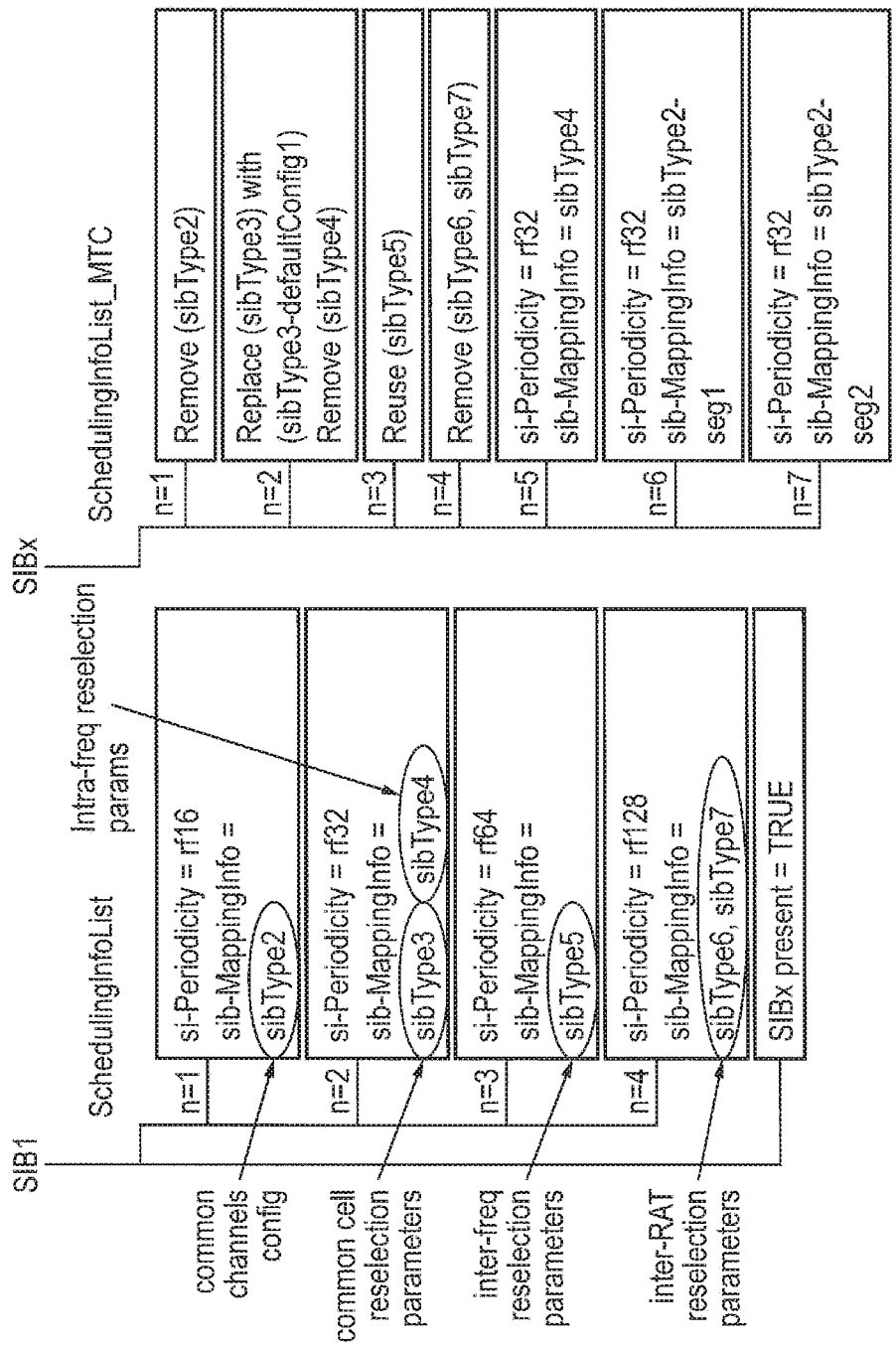
FIG. 6 schematically represents a block of system information containing scheduling information according to present principles along with a block of system information containing scheduling information according to an example of the present disclosure.

Firstly, there is not a large amount of information that can be considered as not essential. This is particularly true if the low complexity devices need to support inter-frequency mobility. This feature is important in the field of wearable technology (such as smartwatches) as the largest sized SIBs are mobility related. Secondly, it is considered by the inventors to be inefficient to broadcast the same information twice. According to the present disclosure, the scheduling information for a block of system information, such as a SIB, is provided by SchedulingInfoList. This is transmitted to the terminal devices in so-called "SIB1". A diagram showing the structure of SIB1 according to the present disclosure is shown in FIG. 6. As with a known SIB1, the SIB1 according to present disclosure is transmitted to the terminal devices at a fixed time location. In examples, the System InformationBlockType1 uses a fixed schedule with a periodicity of 80 ms and repetitions made within 80 ms. The first transmission of System InformationBlockType1 is scheduled in subframe #5 of radio frames for which the SFN mod 8=0, and repetitions are scheduled in subframe #5 of all other radio frames for which SFN mod 2=0. Of course, any appropriate time location may be used The SchedulingInfoList of the SIB1 structure according to the present disclosure contains the scheduling information for the other SIBs. For example, SIB2 is used to send common channel (e.g. PCCH and PRACH) configuration. SIB3 is used to send cell re-selection configuration information. This is common to inter/intra-freq and inter-RAT (for example serving cell thresholds and suitability criteria). SIB4 contains information specific to intra-frequency reselection. SIB5 contains information specific to inter-frequency reselection. SIB6 and SIB7 contains UTRAN and GERAN cell reselection information, respectively. This is similar to the known SIB structure. The order of the SIB1 structure is defined in the 3GPP TS 36.331 section 6.2.2 (SystemInformationBlockType1 Message) Standard.

The SIB1 structure according to embodiments of the present disclosure, however, also includes a flag which indicates whether additional scheduling information in the form of a SIB designed for reduced capability terminal devices is included in SIB1. In FIG. 6, this additional SIB is identified as "SIBx" and the flag is "SIBx present=true". As would be appreciated, although an explicit flag is shown in FIG. 6, in other examples, any marker (a flag or otherwise) indicating that an additional SIB is included may be located in the scheduling information with SIB1, for example, at n=5 in the numbering of FIG. 6 or may be separately included in an existing or newly defined master information block (MIB) to indicate the presence of the additional scheduling block. The marker and the newly defined scheduling may alternatively also be contained in a newly defined MIB which is separate to the existing MIBIn other words, the marker indicating the presence of SIBx is sent in the master information block (MIB) rather than SIB1. The terminal device then does not receive (or otherwise ignores) the scheduling information from SIB1 and instead reads only the scheduling information from SIBx.

Of course, and will be explained later, although only a single additional SIB is identified by the flag, other embodiments may include more than one additional SIB specific for reduced capability terminal devices. For example, one additional SIB may be provided for reduced bandwidth terminal devices and a second additional SIB for coverage enhancement terminal devices. Other embodiments may include an extension to SIB1 containing the additional scheduling information instead of, or in addition to, an additional one or more SIBs.

So, when a terminal device receives the SIB1 structure according to embodiments of the present disclosure, the terminal device checks for the presence of the additional SIBx identified by the flag or otherwise. If the terminal device is a reduced capability terminal device, or operating in coverage enhancement mode, the terminal device will retrieve the SIBx appropriate for the type of reduced capability terminal device or the current coverage mode. However, if the terminal device is not a reduced capability terminal device, or operating in coverage enhancement mode, the terminal device will ignore the additional SIB and continue to process the SIB as already known. This means that the SIB1 according to embodiments of the present disclosure is compatible with both non capability reduced terminal devices, devices operating in coverage enhancement mode, and legacy devices.

If the terminal device is a capability-reduced terminal device or is operating in coverage enhancement mode and has identified the appropriate additional SIBx, the terminal device obtains the SchedulingInfoList from SIBx. For the sake of clarity, the SchedulingInfoList of the additional SIBx is termed "SchedulingInfoList_MTC", although any title may be appropriate.

As will be noted, SchedulingInfoList_MTC contains entries n=1 to n=4 which map to entries n=1 to n=4 of SIB1. So, the order of the scheduling information for SIB1 is the same as the order of the scheduling for SIBx where this mapping occurs. SchedulingInfoList_MTC also contains entries n=5 to n=7 which do not map to entries within SIB1. The purpose of SIBx is to provide instructions on whether and how the various entries of SIB1 (for example in FIG. 6, n=1 to n=4) should be altered by the capability reduced terminal device. The content and function of each of these entries within SIBx will now be explained with reference to the SIBx structure located on the right hand side of FIG. 6.

Entry n=1 of SIBx contains the term "Remove (sibType2)". This means that the reduced capability terminal device is instructed to remove SIB2 from the entry n=1 within SIB1 and hence no system information block will be received at n=1. Entry n=2 of SIBx contains the term "Replace (sibType3) with (sibType3-defaultConfig1) Remove (sibType4)". This means that the reduced capability terminal device will replace the sibType3 in entry n=2 of SIB1 and replace this with a default configuration stored within the reduced capability device. This default configuration may be pre-stored in the reduced capability device or may be transferred to the reduced capability device using some mechanism. Further, the reduced capability terminal device will remove (by not receiving) SIB4 from the entry n=2 within SIB1.

Entry n=3 of SIBx contains the term "Reuse(sibType5)". This means that the reduced capability terminal device is instructed to use the content of SIB5. This may be done using an explicit indication, or for example by omitting (leaving empty) the entry n=3 in the SchedulingInfoList_MTC. Entry n=4 of SIBx contains the term "Remove(sibType6, sibType7)". This means that the reduced capability terminal device will remove (i.e. not receive) SIB6 and SIB7 from entry n=4 within SIB1 and not attempt to receive those.

Entry n=5 to n=7 of SIBx do not map to SIB1. Within entry n=5 to n=7, scheduling for the replacement SIBs that have been removed from entry n=1 to n=4 or for any new (additional) SIBs is included. Specifically, in the example of FIG. 6, entry n=5 of SIBx states that SIB4 will be sent with a periodicity of 32 radio frames. In other words, compared with entry n=2 of SIB1, SIB4 in SIBx is sent on its own without being combined with SIB3. By sending a replacement for any of the mobility related system information (e.g. SIB4, SIB5) it is possible to reduce the number of signalled neighbours compared to the SIB scheduled for other devices resulting in a smaller size of system information block.

Entry n=6 and n=7 of SIBx states that SIB2 be effectively split into two parts, segment 1 and segment 2 (seg1 and seg2 of FIG. 6). Each of these segments will have a periodicity of 32 radio frames.

This splitting of a SIB (in this case SIB2) is particularly useful in instances where a device is located in a weak signal area, such as on the edge of a cell or in a basement (i.e. operating in a so called coverage enhancement mode). Typically, these devices require a SIB to be sent many times in order to receive a complete SIB. By splitting the SIB into segments means that once a segment is received, it does not need to be re-sent. This saves network resources and battery life within the terminal device.

The use of this additional SIB, SIBx, allows a reduced capability terminal device to only use and retrieve SIBs that are relevant to it. This saves battery life within the terminal device. Similarly, in some instances, it is not possible for the reduced capability terminal device to receive the SIB. In this case, the SIB may be split into many segments and retrieved, or may be simply replaced with a default configuration.

Figure 7:
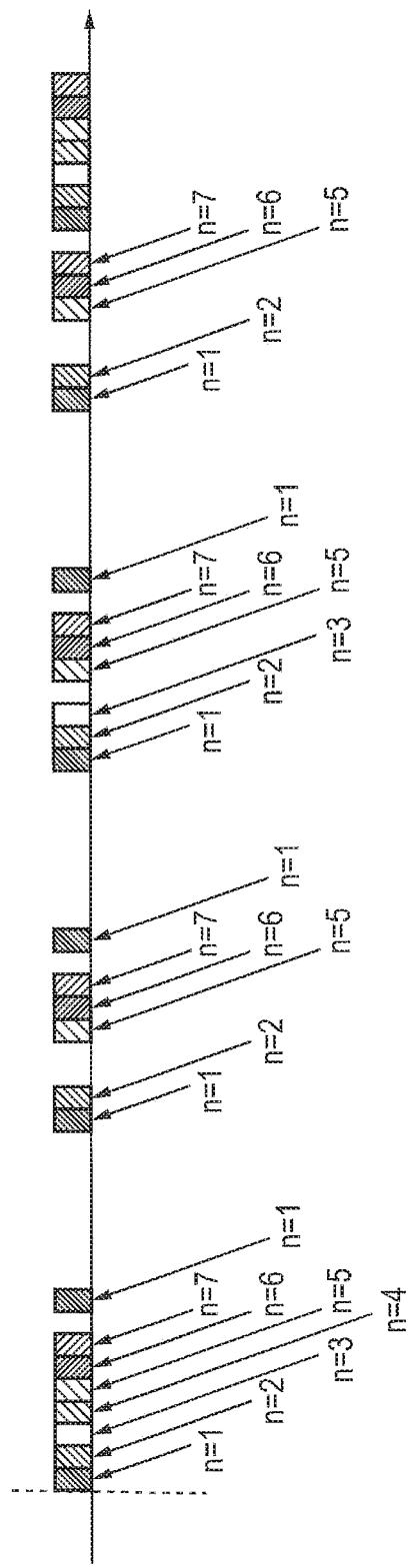
FIG. 7 shows a timing diagram for the blocks of system information according to FIG. 6.

FIG. 7 shows the relative scheduling of each of the SIBs set out in SIB1 and SIBx over time. This is given using the list position and the periodicity given in SIB1 and SIBx of FIG. 6. As would be appreciated, FIG. 7 is illustrative only; entry n=1 (SIB2) is repeated every 16 radio frames; entry n=2 (SIB3, SIB4) is repeated every 32 radio frames; entry n=3 (SIB5) is repeated every 64 radio frames; entry n=4 (SIB6, SIB7) is repeated every 128 radio frames; entry n=5 to n=7 is repeated every 32 radio frames.

An example will now be given with three different types of terminal device and how each may use the information provided in the SIBs to determine what information to decode. The first is a smartphone, the second is a smartwatch and the third is a power meter in a basement. Each of these terminal devices have different capabilities and requirements.

Let us assume that the smartphone supports LTE category 1, UMTS and GSM. Let us also assume the smartwatch is a narrowband LTE device (Rel-13 category) which does not support UMTS or GSM but has to support mobility with LTE. Let us finally assume that the smart meter is either a category 0 (Rel-12) or narrowband (Rel-13) device which also supports coverage enhancement to receive LTE data, including system information. The smart meter is a stationary device and so does not need to support mobility.

A legacy terminal device will only receive the SIBs at n=1, 2, 3, 4. This is because the legacy terminal device does not have a restriction on either RF bandwidth or coverage and so no segmented or reduced information is required.

Figure 8:
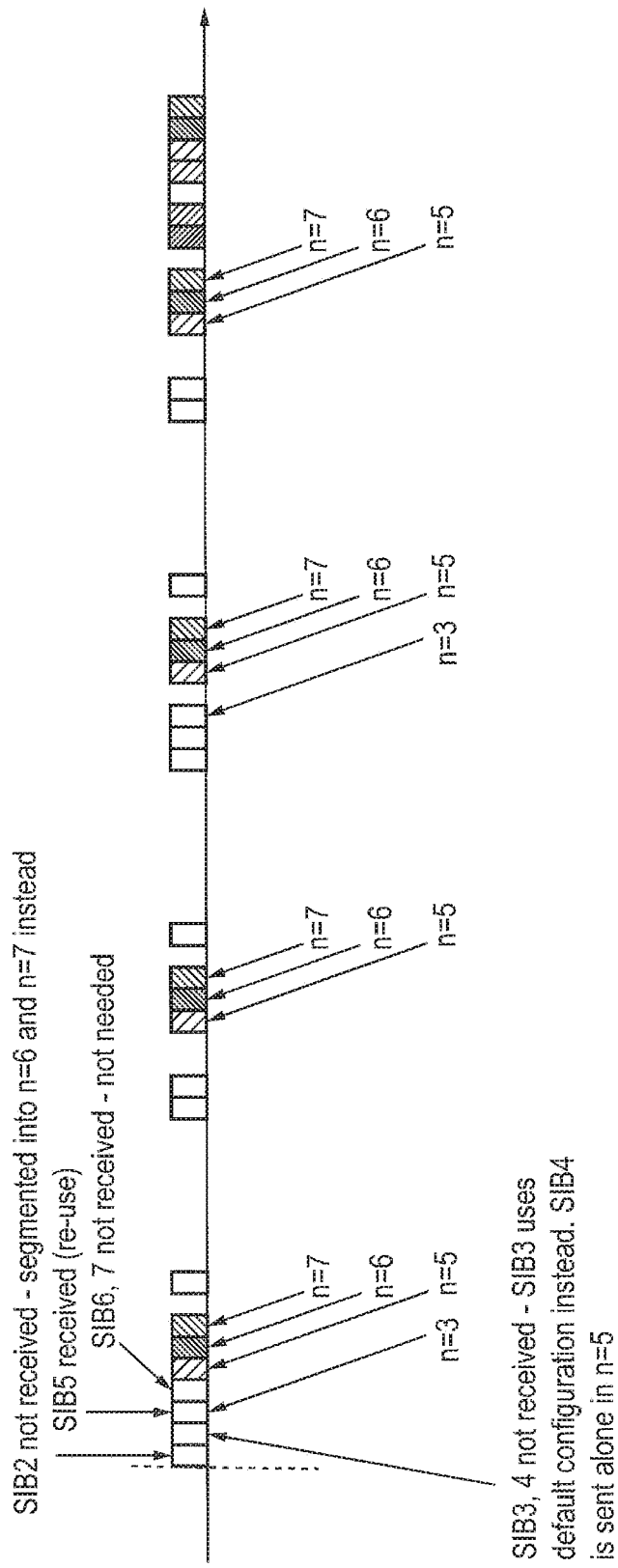
FIG. 8 shows a timing diagram for an example MTC device receiving the block of FIG. 6.

The smartwatch device has narrowband RF so must follow the information given in SIBx. The SIBs received at the smartwatch are shown in FIG. 8.

As the smartwatch is narrowband RF, it is likely that SIB2 (in n=1) will be too large and is spread over more than 6 physical resource blocks, and it is also likely that SIB2 will be too large to segment to support repetition for coverage enhancement, but will be segmented to be received by the smartwatch. Therefore, SIB2 in n=1 will not be received by either the smartwatch or the smart meter, but will instead be received in two segments and provided in n=6 and n=7. By providing these segments in n=6 and n=7, they will not be received by the smartphone or legacy devices. This is because these devices only recognise n=1 to n=4.

The inclusion of SIB3 and SIB4 in n=2 means that SIB3 and SIB4 are also too large to be received by either the smartwatch or the smart meter. SIB5 on the other hand is not too large for 6 physical resource blocks so can be received by the smartwatch. However, as SIB5 relates to inter-frequency reselection parameters, which is a feature of mobility, this is not required by the smart meter and not required to be sent using repetition for coverage enhancement mode. Therefore, SIB5 only needs to be received by the smartwatch.

SIB6 and SIB7 in n=4 are also too large to be spread over 6 physical resource blocks and so cannot be received by either the smartwatch or the smart meter. In any event, as SIB6 and SIB7 relate to UTRAN and GERAN cell reselection respectively, neither the smartwatch nor the smart meter need this information as they only support LTE. Therefore, SIB6 and SIB7 will not be received by either the smartwatch or the smart meter (see n=4 in the SIBx where SIB6 and SIB7 are "removed").

Turning now specifically to FIG. 8 which shows the SIBs received by the smartwatch. As indicated by SIBx, at n=1, SIB2 is not received as it is segmented into two sections and is provided at n=6 and n=7 instead.

At n=2, the smartwatch does not receive SIB3 or SIB4. Instead, n=2 tells the smartwatch to replace the content of SIB3 with a default configuration which may be a pre-defined common channel configuration; this pre-defined common configuration may either be defined in the specifications, defined in the SIM function of the smartwatch, or may be pre-established using, for example, dedicated signalling or hard-coded at manufacture according to an operator-specific configuration. This may contain, for example, fixed reduced capability terminal device specific PRACH resources. Additionally, at n=2 within SIBx, SIB4 is read when it is sent alone in n=5. As SIB4 is not combined with SIB3, SIB4 can be sent using less than 6 physical resource blocks. It should be noted here that the contents of SIB4 (when sent in n=5) may be different to SIB4 sent at n=2. This is because the legacy device (such as the smartphone) will not receive n=5 and may require a larger inter-frequency list than that of the smartwatch. Therefore, by knowing that n=5 will only be received by the smartwatch, it is possible to tailor the SIB information for the smartwatch. This reduces network resource and extends battery life of the smartwatch. It also provides a possibility to perform repetitions in order to support some level of coverage enhancement, which may be required by a reduced capability device in order to meet similar performance requirements as a device without reduced capability. This could be, for example, a coverage enhancement of 3 dB to compensate for the device having only 1 receive antenna.

At n=3, SIB5 from the SchedulingInfoList of SIB1 is reused. This is because it is required by the smartwatch and will also fit within 6 physical resource blocks. It is possible to send SIB5 with additional repetitions. This supports the use of the smartwatch also requiring repetition. In this case, SIB5 would still be scheduled at the same position, but with some additional repetitions. As n=3 is received by legacy devices, the provision of repetitions of SIB5 means that there is possible further support for coverage enhancement of legacy devices.

Additionally, with regard to the smart meter, SIB5 is not required as mobility information is not used by the stationary smart meter. Therefore, the smart meter would only need to read the information contained in SIBx at n=5, 6 and 7. This has the advantage that, in order to support coverage extension, only the new SIBs need to be sent with additional repetitions, while the existing SIBs remain unaffected and require no repetitions.

Although the foregoing has indicated that SIBx may include instructions that relate to scheduling information of SIBs referenced in SIB1, the present disclosure is not so limited. Specifically, SIBx may include instructions that tell the terminal device to ignore all scheduling information located in SIB1. The scheduling information in SIBx may then instead provide scheduling information to the terminal device which relates to the delivery of newly defined SIB types (i.e. SIB types not located in SIB1). In other words, although it is possible that the scheduling information in SIBx relates to the scheduling of SIBs mentioned in SIB1, the present disclosure is not so limited and the scheduling information in SIBx may relate to the scheduling of SIBs not mentioned in SIB1.

Figure 9:
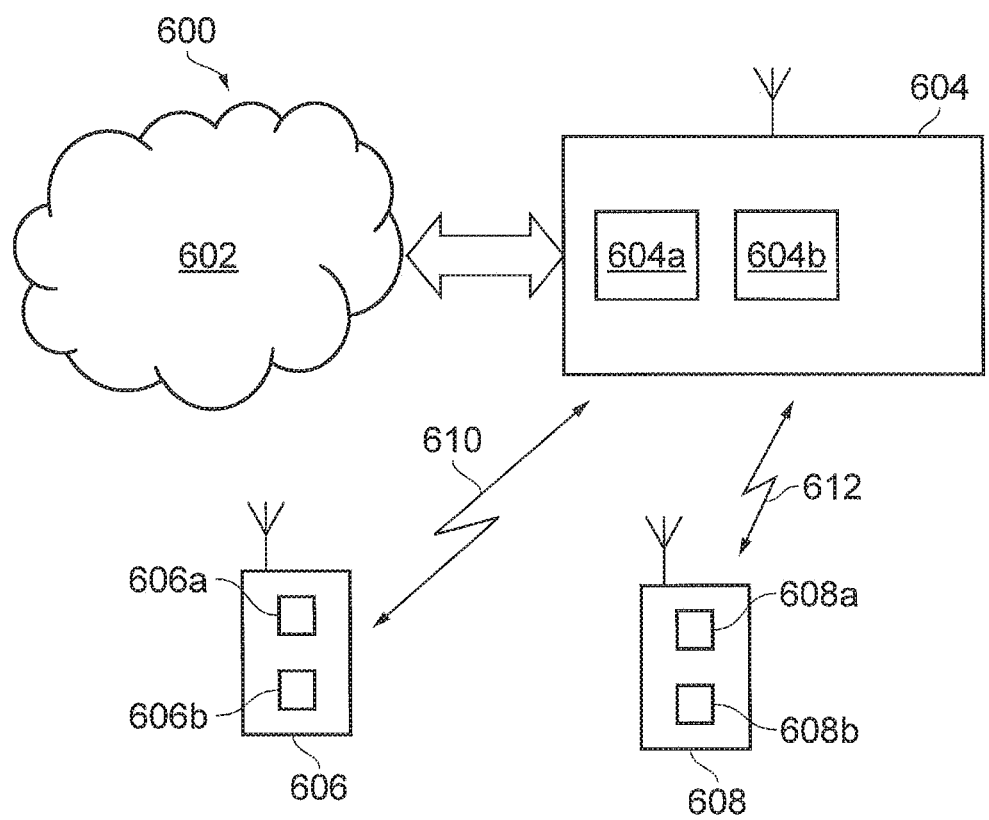
FIG. 9 schematically represents an adapted LTE-type wireless telecommunications system arranged in accordance with an example of the present disclosure.

FIG. 9 schematically shows a telecommunications system 600 according to an embodiment of the present disclosure. The telecommunications system 600 in this example is based broadly around an LTE-type architecture which supports virtual carrier operations such as discussed above. Many aspects of the operation of the telecommunications system 600 are known and understood and are not described here in detail in the interest of brevity. Operational aspects of the telecommunications system 600 which are not specifically described herein may be implemented in accordance with any known techniques, for example according to the current LTE-standards with modifications as appropriate to incorporate virtual carrier operation, such as disclosed in GB 2 487 906 [2], GB 2 487 908 [3], GB 2 487 780 [4], GB 2 488 613 [5], GB 2 487 757 [6], GB 2 487 909 [7], GB 2 487 907 [8], GB 2 487 782 [9], GB 2 497 743 [10] and GB 2 497 742 [11], the entire contents of which are incorporated herein by reference.

The telecommunications system 600 comprises a core network part (evolved packet core) 602 coupled to a radio network part. The radio network part comprises a base station (evolved-nodeB) 604 coupled to a plurality of terminal devices. In this example, two terminal devices are shown, namely a first terminal device 606 and a second terminal device 608. It will of course be appreciated that in practice the radio network part may comprise a plurality of base stations serving a larger number of terminal devices across various communication cells. However, only a single base station and two terminal devices are shown in FIG. 9 in the interests of simplicity.

As with a conventional mobile radio network, the terminal devices 606, 608 are arranged to communicate data to and from the base station (transceiver station) 604. The base station is in turn communicatively connected to a serving gateway, S-GW, (not shown) in the core network part which is arranged to perform routing and management of mobile communications services to the terminal devices in the telecommunications system 600 via the base station 604. In order to maintain mobility management and connectivity, the core network part 602 also includes a mobility management entity (not shown) which manages the enhanced packet service, EPS, connections with the terminal devices 606, 608 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 602 to an external packet data network, for example the Internet. As noted above, the operation of the various elements of the communications system 600 shown in FIG. 9 may be broadly conventional, for example in accordance with established telecoms standards and the principles set out in the referenced documents mentioned herein, apart from where modified to provide functionality in accordance with embodiments of the present disclosure as discussed herein.

In this example, it is assumed the first terminal device 606 is a conventional smartphone type terminal device communicating with the base station 604 in a conventional manner. This conventional terminal device 606 comprises a transceiver unit 606a for transmission and reception of wireless signals and a processor unit (controller unit) 606b configured to control the device 606. The processor unit 606b may comprise a processor unit which is suitably configured/programmed to provide the desired functionality using conventional programming/configuration techniques for equipment in wireless telecommunications systems. The transceiver unit 606a and the processor unit 606b are schematically shown in FIG. 9 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 606 will in general comprise various other elements associated with its operating functionality.

In this example, it is assumed the second terminal device 608 is a machine-type communication (MTC) terminal device 604 adapted to operate in a virtual carrier (VC) mode in accordance with embodiments of the present disclosure when communicating with the base station 604. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 608 in FIG. 9 is such a device.

The MTC device 608 comprises a transceiver unit 608a for transmission and reception of wireless signals and a processor unit (controller unit) 608b configured to control the MTC device 608. The processor unit 608b may comprise various sub-units for providing functionality in accordance with some embodiments of the present disclosure as explained further herein. These sub-units may be implemented as discrete hardware elements or as appropriately configured functions of the processor unit. Thus the processor unit 608b may comprise a processor which is suitably configured/programmed to provide the desired functionality described herein using conventional programming/configuration techniques for equipment in wireless telecommunications systems. The transceiver unit 608a and the processor unit 608b are schematically shown in FIG. 9 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the MTC device 608 will in general comprise various other elements associated with its operating functionality in accordance with established wireless telecommunications techniques.

The base station 604 comprises a transceiver unit 604a for transmission and reception of wireless signals and a processor unit (controller unit) 604b configured to control the base station 604 to operate in accordance with embodiments of the present disclosure as described herein. The processor unit 606b may again comprise various sub-units for providing functionality in accordance with embodiments of the present disclosure as explained further below. These sub-units may be implemented as discrete hardware elements or as appropriately configured functions of the processor unit. Thus, the processor unit 604b may comprise a processor which is suitably configured/programmed to provide the desired functionality described herein using conventional programming/configuration techniques for equipment in wireless telecommunications systems. The transceiver unit 604a and the processor unit 604b are schematically shown in FIG. 9 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 604 will in general comprise various other elements associated with its operating functionality in accordance with established wireless telecommunications techniques.

Thus, the base station 604 is configured to communicate data with both the conventional terminal device 606 and the terminal device 608 according to an embodiment of the disclosure over respective communication links 610, 612. The communication link 610 for communications between the base station 604 and the conventional terminal device 606 is supported by a host carrier (e.g. potentially making use of the full range of transmission resources schematically represented in FIG. 4). The communication link 612 for communications between the base station 604 and the reduced-capability MTC terminal device 608 is supported by a virtual carrier (e.g. making use of resources within a restricted subset of frequency resources such as the virtual carrier schematically represented in FIG. 4). Communications between the MTC terminal device 608 and the base station 604 may generally be based on any of the previously proposed schemes for virtual carrier operation with modification as described herein to provide functionality in accordance with certain embodiments of the disclosure. For example, the MTC terminal device 608 may operate such that all control-plane and user-plane signalling from the base station 604 which is addressed to the terminal device 608 is made within the subset of frequency resources (OFDM carriers) allocated to the virtual carrier provided for the terminal device 608. Alternatively, control-plane signalling from the base station 604 which is addressed to the terminal device 608 may be made within the full-bandwidth of the control region 300 represented in FIG. 4, with higher-layer data (user-plane data) being communicated within the restricted frequency resources (OFDM carriers) allocated to the virtual carrier provided for the terminal device 608.

Finally, although the foregoing has described the terminal device as a smart watch as a wearable device, any type of wearable device is envisaged. For example, according to present principles, the wearable device may be smart glasses, or a fitness band. Further, the device may be located in a vehicle such as a car or van or a boat.

Embodiments of the present disclosure can be exemplified by the following numbered paragraphs.

1. A method of operating a terminal device in a wireless telecommunication system comprising receiving, at the terminal device, at least one of a plurality of blocks of system information at predetermined times, the blocks of system information including i) first scheduling information relating to the timing of at least one additional block of system information and ii) a marker indicating the presence of second scheduling information, wherein the second scheduling information provides an instruction to the terminal device relating to reception of at least one further block of system information.

2. A method according to paragraph 1, wherein the instruction comprises: ignoring reception of one or more additional blocks of system information, 3. A method according to paragraph 1 or 2, wherein the instruction comprises an instruction to receive one or more blocks of system information at the time indicated in the scheduling information.

4. A method according to paragraph 1, 2 or 3, wherein the instruction comprises an instruction to receive one or more blocks of system information at a time different to that indicated in the scheduling information.

5. A method according to any preceding paragraph, wherein the instruction comprises an instruction to receive part of one block of system information at a first time and a second part of the one block of system information at a second time.

6. A method according to paragraph 5, comprising repeating the part of one block of system information.

7. A method according to any preceding paragraph, wherein the instruction comprises an instruction to replace at least part of one block of system information with predefined default information.

8. A method according to any preceding paragraph, wherein the order of the first scheduling information is the same as the order of the second scheduling information.

9. A method according to any preceding paragraph, wherein the marker further indicates a type of terminal device, wherein the terminal device uses the second scheduling information in the event that the terminal device is of the indicated type.

10. A method according to paragraph 9, wherein the order of the first scheduling information is the same as the order of the second scheduling information and the second scheduling information includes scheduling information relating to further blocks of system information useable by that type of terminal device.

11. A method according to any preceding paragraph, wherein the at least one further block of system information includes at least one of the additional blocks of system information.

12. A method of operating a terminal device in a wireless telecommunication system which transmits a master information block and a first and a second system information block the first and second system information block comprising first and second scheduling information relating to the timing of at least one additional block of system information, respectively, the method comprising: receiving, at the terminal device, the master information block of system information that comprises a marker which instructs the terminal device to ignore the first scheduling information and receive only the second scheduling information.

13. A method of operating a terminal device in a wireless telecommunication system which transmits a master information block comprising scheduling information relating to the timing of at least one additional block of system information 14. A terminal device for use in a wireless telecommunication system wherein the terminal device comprises a transceiver unit and a control unit, wherein the control unit is configured to control the transceiver to receive a block of system information at a predetermined time, the block of system information including i) first scheduling information relating to the timing of at least one block of system information and ii) a marker indicating the presence of second scheduling information, wherein the second scheduling information provides an instruction to the terminal device relating to reception of at least one further block of system information.

15. A terminal device according to paragraph 14, wherein the instruction comprises: ignoring reception of one or more further blocks of system information, 16. A terminal device according to paragraph 14 or 15, wherein the instruction comprises an instruction to receive one or more blocks of system information at the time indicated in the scheduling information.

17. A terminal device according to paragraph 14, 15 or 16, wherein the instruction comprises an instruction to receive one or more blocks of system information at a time different to that indicated in the scheduling information.

18. A terminal device according to paragraph 14 to 17, wherein the instruction comprises an instruction to receive part of one block of system information at a first time and a second part of the one block of system information at a second time.

19. A terminal device according to paragraph 18, comprising repeating the part of one block of system information.

20. A terminal device according to paragraph 14 to 19, wherein the instruction comprises an instruction to replace at least part of one block of system information with predefined default information.

21. A terminal device according to paragraph 14 to 19, wherein the order of the first scheduling information is the same as the order of the second scheduling information.

22. A method according to paragraph 14 to 19, wherein the marker further indicates a type of terminal device, wherein the terminal device uses the second scheduling information in the event that the terminal device is of the indicated type.

23. A terminal device according to paragraph 22, wherein the order of the first scheduling information is the same as the order of the second scheduling information and the second scheduling information includes scheduling information relating to further blocks of system information useable by that type of terminal device.

24. A terminal device according to paragraph 14 to 23, wherein the at least one further block of system information include at least one of the additional blocks of system information.

25. A terminal device for use in a wireless telecommunication system which transmits a master information block and a first and a second system information block the first and second system information block comprising first and second scheduling information relating to the timing of at least one additional block of system information, respectively, the terminal device comprising: a controller unit and a transceiver unit, whereby the controller unit is configured to control the transceiver unit to receive the master information block of system information that comprises a marker and in the presence of the marker the controller unit is configured to control the transceiver to ignore the first scheduling information and receive only the second scheduling information 26. A terminal device for use in a wireless telecommunication system which transmits a master information block comprising scheduling information relating to the timing of at least one additional block of system information, wherein the terminal device comprises a transceiver configured to receive the master information block and a controller unit configured to extract the scheduling information from the master information block.

27. A method of operating a base station in a wireless telecommunication system comprising transmitting, to a terminal device, at least one of a plurality of blocks of system information at predetermined times, the blocks of system information including i) first scheduling information relating to the timing of at least one additional block of system information and ii) a marker indicating the presence of second scheduling information, wherein the second scheduling information provides an instruction to the terminal device relating to reception of at least one further block of system information.

28. A method according to paragraph 27, wherein the instruction comprises: ignoring reception of one or more additional blocks of system information, 29. A method according to paragraph 27 or 28, wherein the instruction comprises an instruction to receive one or more blocks of system information at the time indicated in the scheduling information.

30. A method according to paragraph 27 to 29, wherein the instruction comprises an instruction to receive one or more blocks of system information at a time different to that indicated in the scheduling information.

31. A method according to paragraph 27 to 30, wherein the instruction comprises an instruction to receive part of one block of system information at a first time and a second part of the one block of system information at a second time.

32. A method according to paragraph 31, comprising repeating the part of one block of system information.

33. A method according to paragraph 27 to 32, wherein the instruction comprises an instruction to replace at least part of one block of system information with predefined default information.

34. A method according to paragraph 27 to 33, wherein the order of the first scheduling information is the same as the order of the second scheduling information.

35. A method according to paragraph 27 to 34, wherein the marker further indicates a type of terminal device, wherein the terminal device uses the second scheduling information in the event that the terminal device is of the indicated type.

36. A method according to paragraph 35, wherein the order of the first scheduling information is the same as the order of the second scheduling information and the second scheduling information includes scheduling information relating to further blocks of system information useable by that type of terminal device.

37. A method according to paragraph 27 to 36, wherein the at least one further block of system information includes at least one of the additional blocks of system information.

38. A method of operating a base station in a wireless telecommunication system which transmits a master information block and a first and a second system information block the first and second system information block comprising first and second scheduling information relating to the timing of at least one additional block of system information, respectively, the method comprising: transmitting, to the terminal device, the master information block of system information that comprises a marker which instructs the terminal device to ignore the first scheduling information and receive only the second scheduling information.

39. A method of operating a base station in a wireless telecommunication system which transmits a master information block comprising scheduling information relating to the timing of at least one additional block of system information.

A base station for use in a wireless telecommunication system comprising a transceiver unit and controlling unit, the controlling unit being configured to control the transceiver to transmit, to a terminal device, at least one of a plurality of blocks of system information at predetermined times, the blocks of system information including i) first scheduling information relating to the timing of at least one additional block of system information and ii) a marker indicating the presence of second scheduling information, wherein the second scheduling information provides an instruction to the terminal device relating to reception of at least one further block of system information.

41. A base station for use in a wireless telecommunication system comprising a transceiver unit and controlling unit, the controlling unit being configured to control the transceiver to transmit, to a terminal device a master information block and a first and a second system information block the first and second system information block comprising first and second scheduling information relating to the timing of at least one additional block of system information, respectively, the controlling unit being further configured to: transmit, to the terminal device, the master information block of system information that comprises a marker which instructs the terminal device to ignore the first scheduling information and receive only the second scheduling information.

42. A base station for use in a wireless telecommunication system comprising a transceiver unit and controlling unit, the controlling unit being configured to control the transceiver to transmit, to a terminal device a master information block comprising scheduling information relating to the timing of at least one additional block of system information.

43. A wireless telecommunications system comprising the base station according to any one of 40 to 42 and a terminal device.

REFERENCES

[1] ETSI TS 122 368 V11.6.0 (2012-09)/3GPP TS 22.368 version 11.6.0 Release 11)
[2] GB 2 487 906 (UK patent application GB 1101970.0)
[3] GB 2 487 908 (UK patent application GB 1101981.7)
[4] GB 2 487 780 (UK patent application GB 1101966.8)
[5] GB 2 488 513 (UK patent application GB 1101983.3)
[6] GB 2 487 757 (UK patent application GB 1101853.8)
[7] GB 2 487 909 (UK patent application GB 1101982.5)
[8] GB 2 487 907 (UK patent application GB 1101980.9)
[9] GB 2 487 782 (UK patent application GB 1101972.6)
[10] GB 2 497 743 (UK patent application GB 1121767.6)
[11] GB 2 497 742 (UK patent application GB 1121766.8)
[12] Holma H. and Toskala A, "*LTE for UMTS OFDMA and SC-FDMA based radio access*", John Wiley and Sons, 2009
[13] ETSI TS 136 331 V11.4.0 (2013-07)/3GPP TS 36.331 version 11.4.0 Release 11

The invention claimed is:

1. A terminal device comprising:
circuitry configured to:
receive a master information block (MIB), from a wireless telecommunication system, wherein
the wireless telecommunication system is configured to transmit the MIB, a first system information block (SIB), and a second (SIB),
the first SIB includes first scheduling information, the second SIB includes second scheduling information, and the first scheduling information and the second scheduling information relate to a timing of at least one additional block of system information, and
the MIB includes an information element indicating that the second SIB is being transmitted from the wireless telecommunication system;
decode the MIB;
determine whether the information element included in the MIB indicates that the second SIB is being transmitted from the wireless telecommunication system; and
ignore the first SIB and process the second SIB when it is determined that the information element indicates that the second SIB is being transmitted from the wireless telecommunication system, wherein the second scheduling information included in the second SIB indicates a time domain window for receiving at least one additional block of system information.

2. The terminal device of claim 1, wherein
the information element is a one bit flag indicating whether the second SIB is being transmitted from the wireless telecommunication system.

3. The terminal device of claim 1, wherein
the MIB includes timing information relating to a transmission timing of the first SIB.

4. The terminal device of claim 1, wherein
the MIB includes timing information relating to a transmission timing of the second SIB.

5. The terminal device of claim 1, wherein
the first SIB is a System InformationBlockType1.

6. The terminal device of claim 1, wherein
the first SIB is transmitted at a fixed scheduled having a periodicity of 80 ms.

7. The terminal device of claim 1, wherein
the second SIB is a SIB for reduced-capability terminal devices that are configured to operate in a limited bandwidth.

8. The terminal device of claim 1, wherein
the terminal device is a reduced-capability wireless terminal device configured to operate in a limited bandwidth.

9. The terminal device of claim 1, wherein
the MIB, the first SIB, and the second SIB are transmitted in a physical downlink shared channel (PDSCH).

10. Circuitry for a terminal device, the circuitry configured to:
receive a master information block (MIB), from a wireless telecommunication system, wherein
the wireless telecommunication system is configured to transmit the MIB, a first system information block (SIB), and a second (SIB),
the first SIB includes first scheduling information, the second SIB includes second scheduling information, and the first scheduling information and the second scheduling information relate to a timing of at least one additional block of system information, and
the MIB includes an information element indicating that the second SIB is being transmitted from the wireless telecommunication system;
decode the MIB;
determine whether the information element included in the MIB indicates that the second SIB is being transmitted from the wireless telecommunication system; and
ignore the first SIB and process the second SIB when it is determined that the information element indicates that the second SIB is being transmitted from the wireless telecommunication system, wherein the second scheduling information included in the second SIB indicates a time domain window for receiving at least one additional block of system information.

11. The circuitry of claim 10, wherein
the information element is a one bit flag indicating whether the second SIB is being transmitted from the wireless telecommunication system.

12. The circuitry of claim 10, wherein
the MIB includes timing information relating to a transmission timing of the first SIB.

13. The circuitry of claim 10, wherein
the MIB includes timing information relating to a transmission timing of the second SIB.

14. The circuitry of claim 10, wherein
the first SIB is a System InformationBlockType1.

15. The circuitry of claim 10, wherein
the first SIB is transmitted at a fixed scheduled having a periodicity of 80 ms.

16. The circuitry of claim 10, wherein
the second SIB is a SIB for reduced-capability terminal devices that are configured to operate in a limited bandwidth.

17. The circuitry of claim 10, wherein
the terminal device is a reduced-capability wireless terminal device configured to operate in a limited bandwidth.

18. The circuitry of claim 10, wherein
the MIB, the first SIB, and the second SIB are transmitted in a physical downlink shared channel (PDSCH).

19. A method of operating a terminal device in a wireless telecommunication system, the method comprising:
receiving, by the terminal device, a master information block (MIB) from a wireless telecommunication system,
wherein the wireless telecommunication system is configured to transmit the MIB, a first system information block (SIB), and a second SIB,
the first SIB includes first scheduling information, the second SIB includes second scheduling information, and the first scheduling information and the second scheduling information relate to a timing of at least one additional block of system information,
and the MIB includes an information element indicating that the second SIB is being transmitted from the wireless telecommunication system; decoding the MIB;
decode the MIB;
determining whether the information element included in the MIB indicates that the second SIB is being transmitted from the wireless telecommunication system;
ignoring the first SIB and processing the second SIB when it is determined that the information element indicates that the second SIB is being transmitted from the wireless telecommunication system, wherein the second scheduling information included in the second SIB indicates a time domain window for receiving at least one additional block of system information.

\* \* \* \* \*